(12) United States Patent
Usui et al.

(10) Patent No.: US 7,852,730 B2
(45) Date of Patent: Dec. 14, 2010

(54) OPTICAL DISK MEDIUM, AND DATA RECORDING METHOD AND DEVICE

(75) Inventors: Yoshinobu Usui, Kanagawa (JP); Akiya Saito, Kanagawa (JP); Makoto Tsukahara, Shizuoka (JP); Yoshitake Yanagisawa, Shizuoka (JP)

(73) Assignee: Sony Corporation, Tokyo (JP)

( * ) Notice: Subject to any disclaimer, the term of this patent is extended or adjusted under 35 U.S.C. 154(b) by 1305 days.

(21) Appl. No.: 10/343,226

(22) PCT Filed: Jun. 3, 2002

(86) PCT No.: PCT/JP02/05416

§ 371 (c)(1),
(2), (4) Date: Jan. 30, 2003

(87) PCT Pub. No.: WO02/101733

PCT Pub. Date: Dec. 19, 2002

(65) Prior Publication Data
US 2003/0152009 A1 Aug. 14, 2003

(30) Foreign Application Priority Data
Jun. 8, 2001 (JP) ............................. 2001-173781
Sep. 5, 2001 (JP) ............................. 2001-269100

(51) Int. Cl.
*G11B 7/00* (2006.01)
(52) U.S. Cl. ............... 369/59.25; 369/53.21; 369/275.3
(58) Field of Classification Search ............. 369/53.21, 369/59.25, 275.3, 275.4
See application file for complete search history.

(56) References Cited

U.S. PATENT DOCUMENTS 5,706,266 A 1/1998 Brownstein et al.

(Continued)

FOREIGN PATENT DOCUMENTS

JP 08-129828 5/1996

(Continued)

OTHER PUBLICATIONS

Extended European Search Report issued May 8, 2009 for corresponding European Application No. 09 15 5154.

(Continued)

*Primary Examiner*—Wayne R Young
*Assistant Examiner*—Lixi Chow
(74) *Attorney, Agent, or Firm*—Rader, Fishman & Grauer PLLC (57) ABSTRACT

A molding and film forming apparatus 700 molds a disc substrate from a stamper 330 formed from an optical disc disc-master 320 and forms a coating film, for example, a reflective film onto the disc substrate, thereby forming a recorded optical disc 360. A postscript apparatus 200 writes postscript information once onto an optical disc 340 formed by the molding and film forming apparatus 700. As postscript information, a laser beam is irradiated to a predetermined interval of the optical disc 340, a portion which is detected as a pit is formed, and an optical disc 350 on which postscript information 420 has been recorded is formed. Identification information which enables each optical disc 340 to be identified can be postscribed. The postscript information is recorded in a conventional format and the postscript information can be reproduced by an existing reproducing apparatus.

6 Claims, 10 Drawing Sheets

U.S. PATENT DOCUMENTS

| | | | |
|---|---|---|---|
| 5,809,007 A * | 9/1998 | Takemura et al. | 369/275.3 |
| 6,144,742 A * | 11/2000 | Gotoh et al. | 369/53.21 |
| 6,414,913 B1 | 7/2002 | Kobayashi et al. | |
| 6,600,716 B1 * | 7/2003 | Kondo | 369/275.3 |
| 6,810,004 B1 * | 10/2004 | Sako | 369/275.4 |
| 2002/0067674 A1 * | 6/2002 | Schneck et al. | 369/53.22 |
| 2004/0047252 A1 * | 3/2004 | Miyatake et al. | 369/47.12 |

FOREIGN PATENT DOCUMENTS

| | | |
|---|---|---|
| JP | 8-129828 | 5/1996 |
| JP | 10-233019 | 9/1998 |
| JP | 2001-135021 | 5/2001 |
| WO | WO-95/03655 | 2/1995 |

OTHER PUBLICATIONS

Supplemental European Search Report dated Jun. 4, 2008 for corresponding European Application No. 02 73 0868.

* cited by examiner

OPTICAL DISK MEDIUM, AND DATA RECORDING METHOD AND DEVICE

TECHNICAL FIELD

The invention relates to an optical disc medium and data recording method and apparatus which are applied to an optical disc of, for example, a read only (ROM) type.

BACKGROUND ART

The standard of a compact disc (CD) which is widespread nowadays is called compact disc audio and based on the standard disclosed in the Red Book. On the basis of the Red Book, various formats including a CD-ROM have been standardized and what is called a CD family is constructed. In the following description, a mere denomination "CD" generally indicates a disc of various formats included in the CD family. An optical disc such as a CD or the like is used in various fields as a recording medium for recording music data, motion image data, an application program of a game or a computer, or the like.

Figure 10:
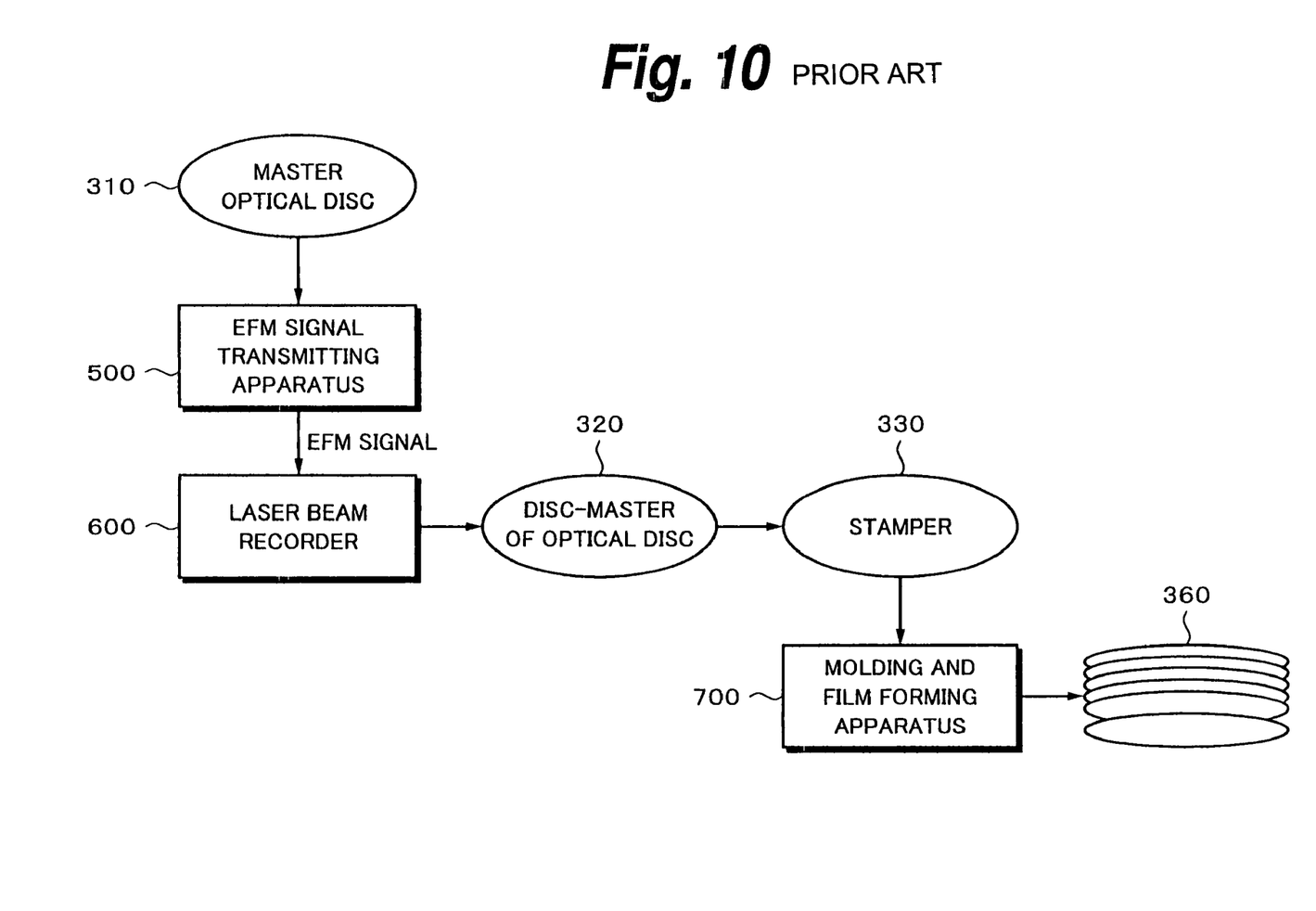
FIG. 10 is a constructional diagram of an existing optical disc forming system.

A conventional forming system of an optical disc will be described with respect to the case of the CD as an example. FIG. 10 is a constructional diagram of an optical disc forming system which is applied to the CD. The forming system of the CD mainly comprises: a mastering apparatus for forming a disc-master of an optical disc by a laser beam; and a molding and film forming apparatus for forming a number of disc substrates by using a stamper formed from the disc-master of the optical disc and forming a film onto each disc substrate.

The mastering apparatus to form a disc-master 320 of the optical disc comprises an EFM signal transmitting apparatus 500 and a laser beam recorder 600. A molding and film forming apparatus 700 molds a disc substrate from a stamper 330 formed from the optical disc disc-master 320 and forms a coating film, for example, a reflective film onto the disc substrate, thereby forming a recorded optical disc 360. The EFM signal transmitting apparatus 500 reads information data to be recorded from a master optical disc 310 and outputs an EFM signal formed by EFM (Eight to Fourteen Modulation) modulating the read-out signal to the laser beam recorder 600. The optical disc disc-master 320 is formed by coating a photoresist as a photosensitive material onto a glass plate. The laser beam recorder 600 irradiates a laser beam according to the EFM signal onto the optical disc disc-master 320. The photoresist film is developed and in the case of a positive type resist, the photosensitized portion is melted, a concave/convex pattern is formed on the photoresist film, and a pit train according to a predetermined format is formed on the surface of the optical disc disc-master 320.

Subsequently, on the basis of the optical disc disc-master 320, a die called the stamper 330 onto which the pit pattern of the optical disc disc-master 320 has been inversely transferred is formed. The molding and film forming apparatus 700 forms the disc substrate by using the stamper 330. Further, a coating film such as a reflective film or the like and a protective film are coated onto the disc substrate, so that the recorded optical disc 360 is copied. The concave/convex pattern formed on the optical disc disc-master 320 is transferred onto the disc substrate and the pit pattern is formed. A compression molding, an injection molding, a light hardening method, or the like is known as a method of forming the disc substrate.

The recorded optical disc 360 formed by the conventional optical disc forming system is not a recordable film but is a disc coated with the reflective film as a coating film and is a read only type, so that additional information cannot be recorded after the disc was formed.

In recent years, in order to make management or the like of the recorded optical disc 360 on which predetermined information data has been recorded, a method of recording additional information such as a unique identification number or the like onto the recorded optical disc 360 every disc is demanded. However, since the recorded optical disc 360 is manufactured by the foregoing forming step, it is difficult to record the additional information onto the recorded optical disc 360 which is obtained after it was processed by the molding and film forming apparatus 700 and on which the predetermined information data has been recorded without exerting an influence on the recorded information data.

Therefore, the conventional methods proposed as systems for recording the additional information such as an identification number or the like onto the recorded optical disc use a method of recording the additional information by a system different from a recording modulation system of a main signal. However, the recorded optical disc 360 on which the additional information has been recorded by those methods cannot be read out by drives other than a drive having a dedicated reading function and the additional information cannot be read out by the existing drives, so that there is a problem such that compatibility is poor.

A BCA (Burst Cutting Area) has been defined in a DVD-ROM and the additional information can be recorded there. However, such an area is provided as another area different from a main signal (EFM+modulation) portion and cannot be read out by drives other than the drive having the dedicated reading function. The BCA is not applied to a DVD-Video or the like.

As mentioned above, according to the optical discs such as CD and MD based on the conventional standard and DVD disc excluding the DVD-ROM or the like, after they are once recorded, the additional information such as an identification number or the like cannot be recorded.

The invention is made in consideration of the problems as mentioned above and it is an object of the invention to provide an optical disc medium on which additional information has been recorded onto a recorded optical disc on the basis of the conventional standard and to provide data recording method and apparatus.

DISCLOSURE OF INVENTION

To solve the foregoing problems, according to a feature of the invention, there is provided an optical disc medium having a substrate on which a shape according to modulated information data has been formed and a coating film formed on the substrate, wherein a no-modulating interval is partially provided and predetermined postscript information has been recorded into the no-modulating interval by recording it to the coating film.

According to a feature of the invention, there is provided an optical disc medium having a substrate on which a shape according to information data modulated by a modulating method in which a minimum inverting interval and a maximum inverting interval have been specified has been formed and a coating film formed on the substrate, wherein predetermined postscript information has been recorded into predetermined recorded information data by recording it to the coating film so as not to infringe the rule of the minimum inverting interval and the maximum inverting interval.

According to a feature of the invention, there is provided an optical disc medium having a substrate on which a shape according to information data modulated by a modulating method in which a minimum inverting interval and a maximum inverting interval have been specified has been formed and a coating film formed on the substrate, wherein predetermined postscript information has been recorded into a predetermined interval of recorded information data by recording it to the coating film so that an error is detected upon reproduction.

According to a feature of the invention, there is provided an optical disc medium having a substrate on which a shape according to information data modulated by a modulating method in which a minimum inverting interval and a maximum inverting interval have been specified has been formed and a coating film formed on the substrate, wherein after error information which infringes the rule of the minimum inverting interval and the maximum inverting interval was recorded in a predetermined interval, information to correct the error information so as to satisfy the rule has been recorded in such an interval by recording it to the coating film.

According to a feature of the invention, there is provided an optical disc medium having a substrate on which a shape according to modulated information data has been formed and a coating film formed on the substrate, wherein known data has been recorded in a predetermined location, a part of the known data is rewritten by recording it to the coating film, and desired information is recorded in accordance with whether the rewriting has been performed or not.

According to a feature of the invention, there is provided a recording method of forming an optical disc medium having a substrate on which a shape according to modulated information data has been formed and a coating film formed on the substrate, wherein a no-modulating interval is partially provided and predetermined postscript information is recorded into the no-modulating interval by recording it to the coating film. According to a feature of the invention, there is provided a data recording apparatus for recording predetermined postscript information into a no-modulating interval by recording it to the coating film.

According to a feature of the invention, there is provided a recording method of forming an optical disc medium having a substrate on which a shape according to information data modulated by a modulating method in which a minimum inverting interval and a maximum inverting interval have been specified has been formed and a coating film formed on the substrate, wherein predetermined postscript information is recorded into predetermined recorded information data by recording it to the coating film so as not to infringe the rule of the minimum inverting interval and the maximum inverting interval. According to a feature of the invention, there is provided a data recording apparatus for recording predetermined postscript information to a coating film.

According to a feature of the invention, there is provided a recording method of forming an optical disc medium having a substrate on which a shape according to information data modulated by a modulating method in which a minimum inverting interval and a maximum inverting interval have been specified has been formed and a coating film formed on the substrate, wherein predetermined postscript information is recorded into a predetermined interval of recorded information data by recording it to the coating film so that an error is detected upon reproduction. According to a feature of the invention, there is provided a data recording apparatus for recording predetermined postscript information to a coating film so that an error is detected upon reproduction.

According to a feature of the invention, there is provided a recording method of forming an optical disc medium having a substrate on which a shape according to information data modulated by a modulating method in which a minimum inverting interval and a maximum inverting interval have been specified has been formed and a coating film formed on the substrate, wherein after error information which infringes the rule of the minimum inverting interval and the maximum inverting interval was recorded in a predetermined interval, information to correct the error information so as to satisfy the rule is recorded in such an interval by recording it to the coating film. According to a feature of the invention, there is provided a data recording apparatus for recording information to correct error information so as to satisfy a rule to a coating film after the error information was recorded.

According to a feature of the invention, there is provided a recording method of forming an optical disc medium having a substrate on which a shape according to modulated information data has been formed and a coating film formed on the substrate, wherein known data is recorded in a predetermined location, apart of the known data is rewritten by recording it to the coating film, and desired information is recorded in accordance with whether the rewriting has been performed or not. According to a feature of the invention, there is provided a data recording apparatus for rewriting a part of known data and recording desired information in accordance with whether rewriting has been performed or not.

BEST MODE FOR CARRYING OUT THE INVENTION

Embodiments of the invention will be described hereinbelow with reference to the drawings. Since the embodiments which will be described hereinbelow are preferred embodiments of the invention, various limitations which are technically preferable are added to them. However, the scope of the invention is not limited to those embodiments unless there is particularly a disclosure which limits the invention in the following explanation.

Figure 1:
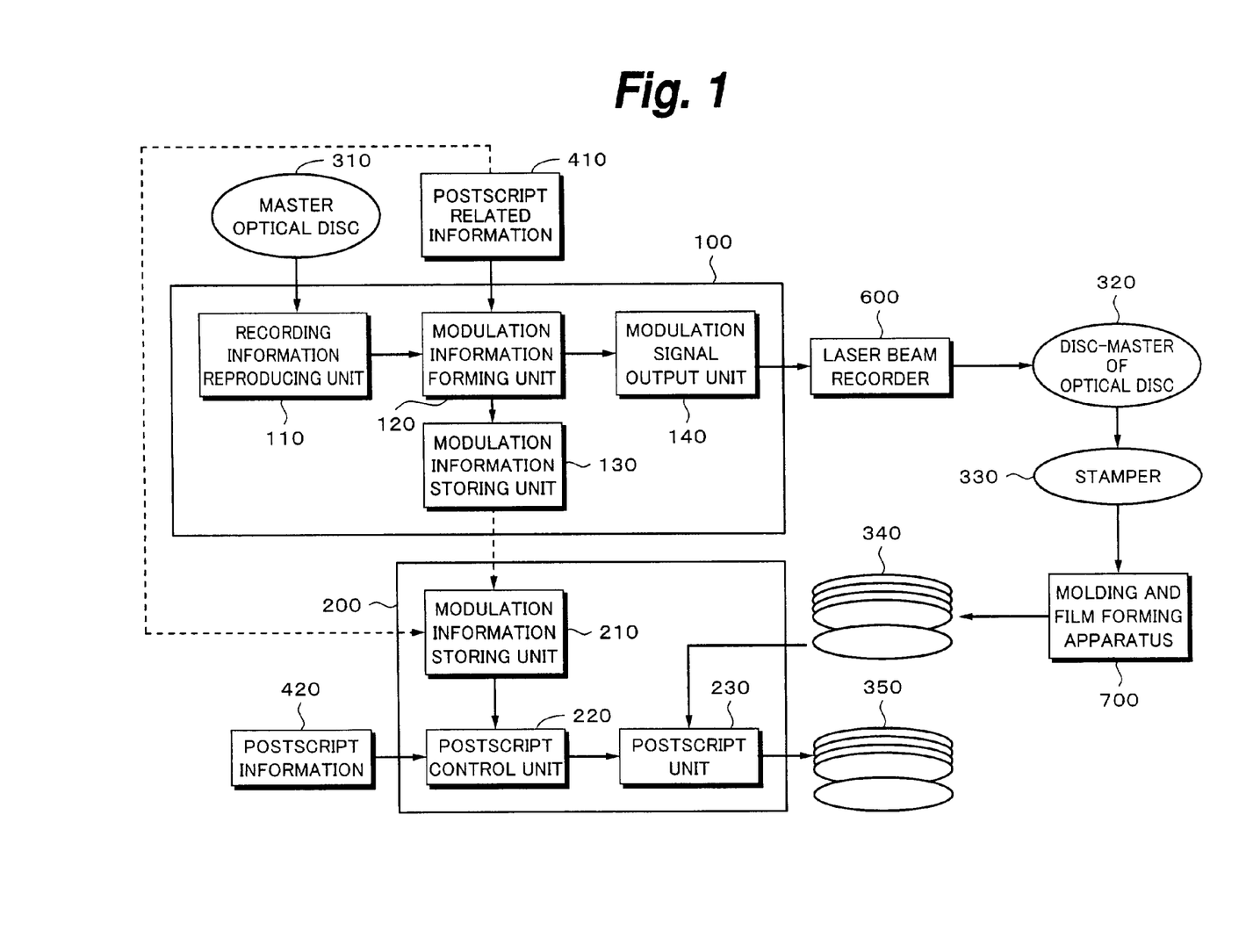
FIG. 1 is a constructional diagram of an optical disc forming system according to an embodiment of the invention.

FIG. 1 is a constructional diagram of an optical disc forming system to which the invention is applied. The optical disc forming step according to the invention mainly comprises: a mastering step of forming a disc-master of an optical disc by a laser beam; a molding and film forming step of forming a number of disc substrates by using a stamper formed from the disc-master of the optical disc and forming a film onto each disc substrate; and a postscript step.

A mastering apparatus to form the disc-master 320 of the optical disc comprises the EFM signal transmitting apparatus 500 and the laser beam recorder 600. The molding and film forming apparatus 700 molds a disc substrate from the stamper 330 made on the basis of the optical disc disc-master 320 and forms a coating film, for example, a reflective film onto the disc substrate, thereby forming a recorded optical disc 360. A postscript apparatus 200 writes postscript information once onto an optical disc 340 formed by the molding and film forming apparatus 700.

The optical disc disc-master 320 is formed by coating a photoresist as a photosensitive material onto a glass plate. The laser beam recorder 600 irradiates a laser beam onto the optical disc disc-master 320 in accordance with a signal from a modulation signal transmitting apparatus 100. The photoresist film is developed and in the case of the positive type resist, the photosensitized portion is melted, a concave/convex pattern is formed on the photoresist film, and a pit train, a groove, or the like according to a predetermined format is formed on the surface of the optical disc disc-master 320.

Subsequently, on the basis of the optical disc disc-master 320, a die called a stamper 330 onto which the pit pattern of the optical disc disc-master 320 has been inversely transferred is formed. The molding and film forming apparatus 700 forms the disc substrate by using the stamper 330. Further, a coating film and a protective film are coated onto the disc substrate, so that the recorded optical disc 340 is formed. The concave/convex pattern formed on the optical disc disc-master 320 is transferred onto the disc substrate and the pit pattern is formed. The compression molding, injection molding, light hardening method, or the like is known as a method of forming the disc substrate.

The modulation signal transmitting apparatus 100 comprises: a recording information reproducing unit 110 for reading information data which is recorded onto the optical disc from the master optical disc 310 and reproducing it; a modulation information forming unit 120 for converting the reproduced information data into modulation data in a predetermined format; a modulation information storing unit 130 for storing the modulation data information; and a modulation signal output unit 140 for outputting a modulation signal.

The recording information reproducing unit 110 sequentially reproduces the predetermined information data recorded on the master optical disc 310 from a whole area and sends the reproduced information data to the modulation information forming unit 120. The master optical disc 310 is a master media (information source) such as a CD-R or the like and the predetermined information data which is recorded onto the optical disc disc-master 320 has been recorded there. The predetermined information data is arbitrary information data such as music data, video data, program, or the like. The recording information reproducing unit 110 executes, for example, an encoding process of error correction encoding.

The modulation information forming unit 120 converts the reproduced information data into data in a predetermined format and, further, executes a predetermined digital modulating process. For example, data in the data format of the CD is formed and EFM modulation is executed to the data. The formed modulation data is stored into the modulation information storing unit 130 and outputted to the modulation signal output unit 140. The modulation data is data of a bit pattern of 1/0 in a predetermined format. As necessary, the modulation information forming unit 120 refers to postscript related information 410 regarding the postscript process such as designation or the like of an area where a postscript process is executed.

The modulation information storing unit 130 stores the modulation data formed by the modulation information forming unit 120. The modulation signal output unit 140 forms the modulation signal by outputting the modulation data formed by the modulation information forming unit 120 in response to a predetermined clock and outputs it to the laser beam recorder 600.

The laser beam recorder 600 modulates intensity of the laser beam on the basis of the modulation signal from the modulation signal transmitting apparatus 100, irradiates it onto the optical disc disc-master 320, and records the information data. The stamper 330 is formed on the basis of the optical disc disc-master 320.

By using the stamper 330, the molding and film forming apparatus 700 copies the recorded optical disc 340 on which the information data has been recorded. Although the information data has already been recorded on the recorded optical disc 340 as mentioned above, this disc is an optical disc in a state where the postscript information is not recorded yet.

The postscript apparatus 200 comprises: a modulation information storing unit 210 for storing the postscript related information 410 or modulation data; a postscript control unit 220 for controlling a postscript process; and a postscript unit 230 for performing the postscript process to the optical disc 340 in accordance with the postscript control unit 220.

The modulation information storing unit 210 is a storing unit for storing the postscript related information 410 used by the modulation signal transmitting apparatus 100 or the modulation data formed by the modulation signal transmitting apparatus 100. The postscript control unit 220 controls so as to calculate an area for recording postscript information 420 and write the postscript information 420 once into this area on the basis of the postscript related information 410 or the modulation data. In accordance with the postscript control unit 220, the postscript unit 230 irradiates a laser beam of a high power onto the optical disc 340, so that an optical disc 350 on which the postscript information 420 has been recorded is formed. The postscript information 420 is, for example, arbitrary information such as information regarding the optical disc 340 or the like. In the postscript apparatus 200, the postscript information 420 can be also changed every optical disc 340 and, for instance, unique identification information which enables each optical disc 340 to be identified can be also postscribed.

The operation of the optical disc forming system having such a construction and an optical disc forming method will be described.

In the modulation signal transmitting apparatus 100, the recording information reproducing unit 110 reproduces the information data recorded on the master optical disc 310 and sends it to the modulation information forming unit 120. The modulation information forming unit 120 converts the reproduced information data into a predetermined format with reference to the postscript related information 410 as necessary, thereby forming modulation data. The modulation data is stored into the modulation information storing unit 130, sent to the modulation signal output unit 140, and outputted as a modulation signal to the laser beam recorder 600.

The laser beam recorder 600 irradiates the laser beam onto the photoresist of the optical disc disc-master 320 in accordance with the modulation signal. Subsequently, the optical disc disc-master 320 is developed and the stamper 330 is formed on the basis of the photosensitive pattern. The molding and film forming apparatus 700 molds a disc substrate by using the stamper 330 and, further, forms a film onto the disc substrate, thereby forming the optical disc 340. The optical disc 340 on which the information data has been recorded is formed by the steps so far.

In the subsequent postscript apparatus 200, the postscript related information 410 or the modulation signal data pattern used by the modulation signal transmitting apparatus 100 has previously been stored in the modulation information storing unit 210. The postscript control unit 220 controls the postscript unit 230 so as to calculate the area for recording the postscript information 420 and write the postscript information 420 once into this area on the basis of the postscript related information 410 or the modulation data. In accordance with the postscript control unit 220, the postscript unit 230 irradiates the laser beam whose intensity has been modulated in accordance with the data of the postscript information 420 onto the optical disc 340, thereby forming the optical disc 350.

Although the postscript related information 410 is referred to as necessary on the modulation signal transmitting apparatus 100 side as mentioned above, the modulation signal is formed by a modulating process similar to the conventional one. The optical disc 340 is formed on the basis of this modulation signal. In the postscript apparatus 200, an area for recording the postscript information 420 is calculated and the postscript information 420 is recorded in accordance with the postscript related information 410 or the modulation data. Since the postscript information 420 can be arbitrarily set, individual identification information can be inserted into the recorded optical disc of the conventional modulation system. The postscript information such as identification information or the like whose recording has been difficult in the conventional system can be recorded onto the recorded optical disc as mentioned above, so that use fields of the optical disc can be widened.

Since the postscript information which is postscribed is recorded in the conventional format, it can be read out without remodeling a reproducing apparatus (player, drive, etc.) and without a special circuit. Further, by adding the postscript apparatus without changing the existing step of manufacturing the optical discs, the postscript process can be performed.

Figure 2:
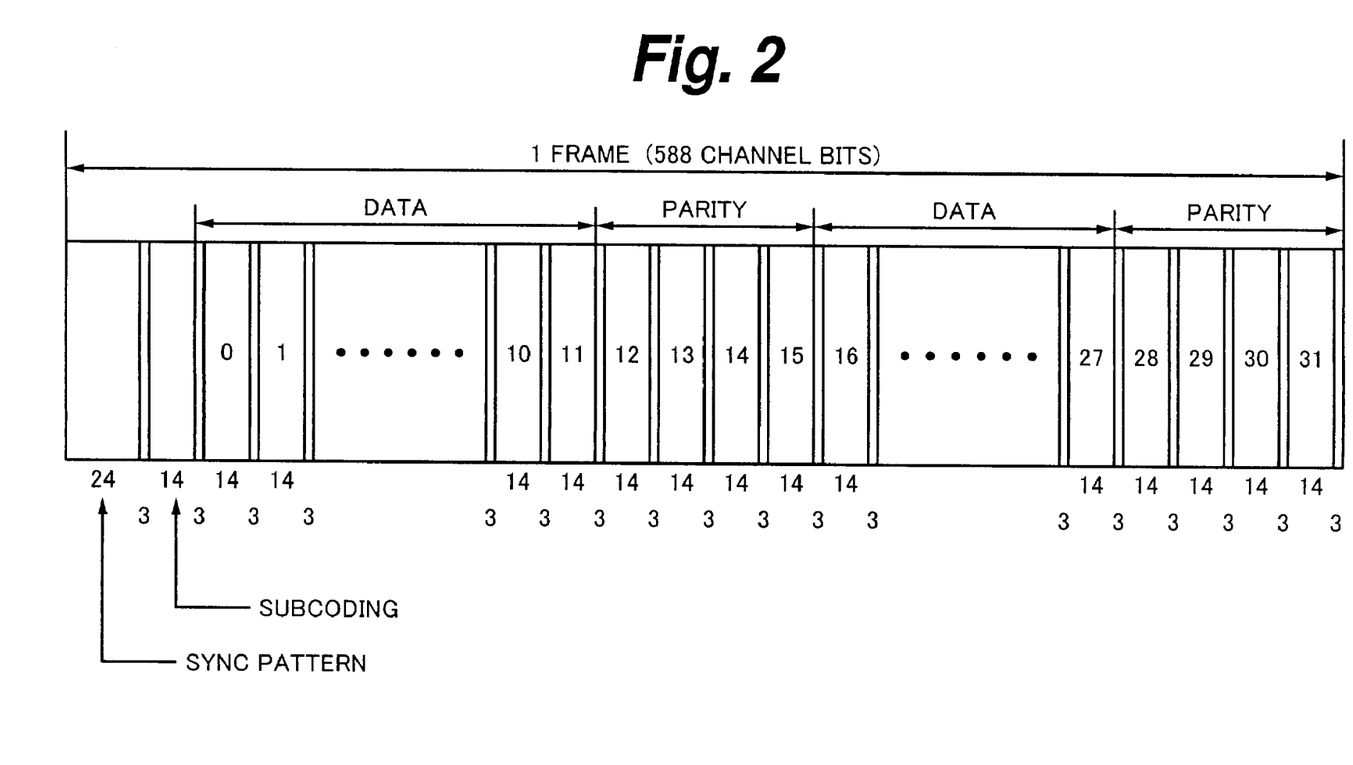
FIG. 2 is a schematic diagram showing a signal format of a CD.

A specific recording method of the postscript information will now be described by using an example of a CD. FIG. 2 shows a data construction of one frame of the CD. In the CD, a parity Q and a parity P each consisting of 4 symbols are formed from a total of 12 samples (24 symbols) of digital audio data of 2 channels. One symbol of a subcode is added to the total of 32 symbols and resultant 33 symbols (264 data bits) are handled as one group. That is, 33 symbols comprising the subcode of 1 symbol, data of 24 symbols, the Q parity of 4 symbols, and the P parity of 4 symbols are included in one frame obtained after the EFM modulation.

In the EFM, each symbol (8 data bits) is converted into 14 channel bits. A minimum inverting interval (inverting interval in which the number of 0 between 1 and 1 of the recording signal is the minimum) Tmin of the EFM modulation is equal to 3T. A pit length corresponding to 3T is equal to 0.87 μm. A pit length corresponding to T is the shortest pit length. A maximum inverting interval (inverting interval in which the number of 0 between 1 and 1 of the recording signal is the maximum) Tmax is equal to 1T. Also in the case of connecting 14 bits and 14 bits, margin bits (also called coupling bits) of 3 bits are arranged between the 14 channel bits and the 14 channel bits in order to satisfy run length restricting conditions of Tmin=3T and Tmax=11T mentioned above. Four kinds of patterns of (000), (001), (010), and (100) are prepared as margin bits. Further, a frame sync pattern is added to the head of the frame. Assuming that a period of the channel bits is equal to T, the frame sync pattern is set to a pattern in which 11T, 11T, and 2T continue. According to the EFM modulation rule, since such a pattern is not caused, it enables a frame sync to be detected by a specific pattern. The total number of bits of one frame is equal to 588 channel bits. A frame frequency is equal to 7.35 kHz.

98 frames are called a subcode frame (or subcode block). The subcode frame in which 98 frames are rearranged so as to be continuous in the vertical direction and shown is constructed by: a frame sync portion to identify the head of the subcode frame; a subcode portion; and a data and parity portion. The subcode frame corresponds to $1/75$ second of a reproducing time of the ordinary CD.

The subcode portion is formed by 98 frames. Each of head two frames in the subcode portion is a sync pattern of the subcode frame and is also a pattern of "out of rule" of the EFM. The respective bits in the subcode portion construct P, Q, R, S, T, U, V, and W channels.

Several examples of the recording method of the postscript information according to the invention will now be sequentially explained.

The first recording method of the postscript information is a method whereby in the modulation signal transmitting apparatus, the modulation signal in which the no-modulating interval is provided in an arbitrary interval of the modulation signal is formed at the time of the modulation of the information data and an optical disc is manufactured, and the postscript information is recorded in the no-modulating interval by the postscript apparatus.

Figure 3:
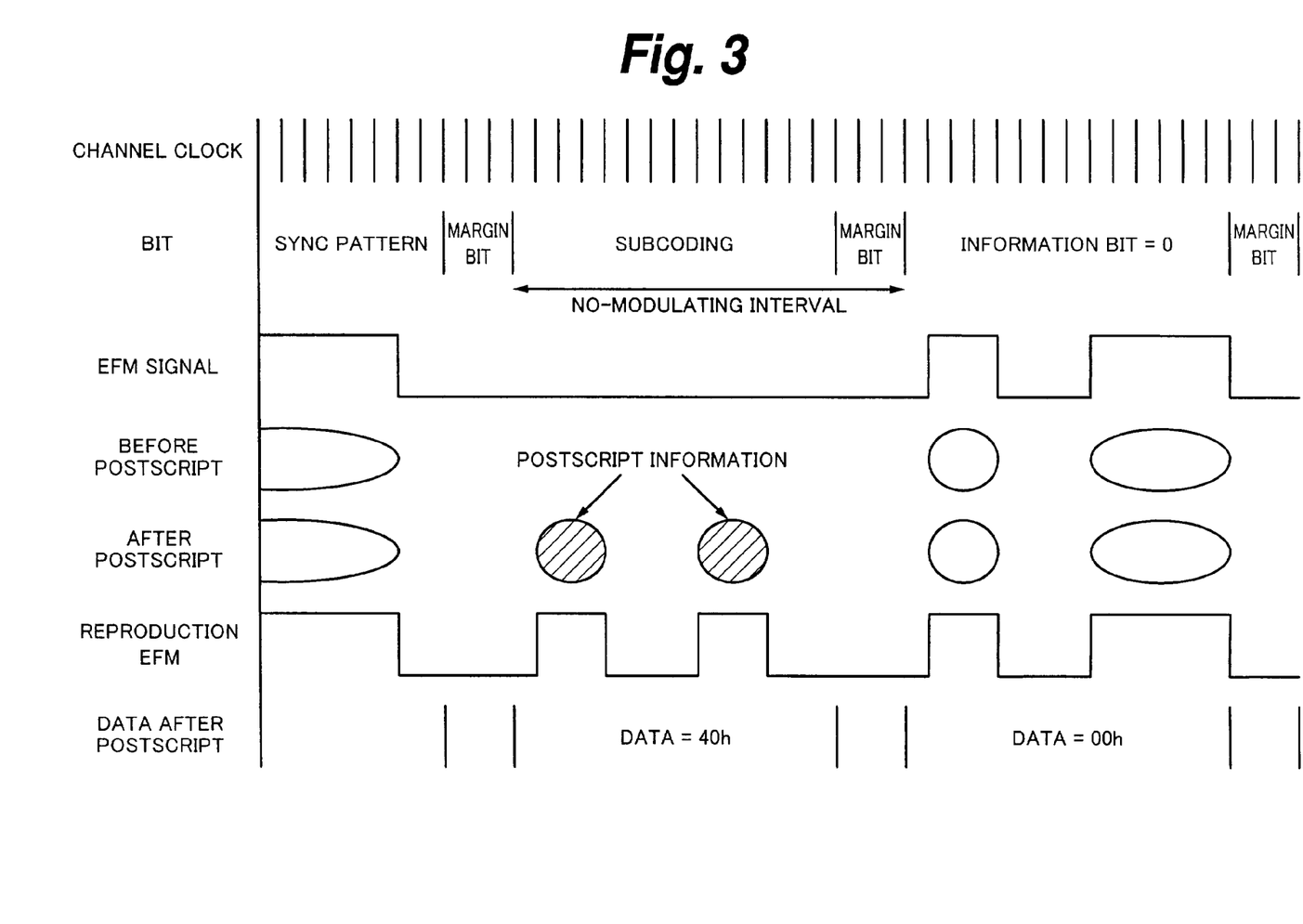
FIG. 3 is a schematic diagram for explaining a first postscript information recording method according to the invention.

FIG. 3 is a diagram for explaining the first postscript information recording method according to the invention.

In the modulation signal transmitting apparatus 100, information regarding the no-modulating interval which is inserted into the modulation data (hereinafter, properly called an EFM signal) is obtained from the postscript related information 410. In which position of the EFM data the no-modulating interval is inserted and how many no-modulating intervals are inserted are arbitrarily set and are not specified. However, they are set in a manner such that a tracking servo can be performed to the optical disc 340 in which the no-modulating intervals have been inserted, that is, the continuous no-modulating intervals are set to a band below a band of the tracking servo. A method for such a tracking is not particularly limited.

In the example of FIG. 3, the subcoding portion of 8 bits in the case before the EFM modulation and 14 channel bits in the case after the modulation is set to the no-modulating interval. The no-modulating intervals can be provided in arbitrary positions in the subcoding portion and the data portion excluding the sync pattern. A plurality of no-modulating intervals can be also provided at certain regular intervals or at random intervals. In accordance with such postscript related information 410, the modulation information forming unit 120 forms the EFM signal in which the no-modulating intervals are provided in a part of the EFM data pattern and outputs it to the laser beam recorder 600. A waveform of the EFM signal which is outputted to the laser beam recorder 600, that is the EFM signal recorded onto the optical disc disc-master 320 is set so that a signal level of the subcoding portion is equal to 0. In the optical disc 340 which is manufactured in accordance with it, no pit exists in the subcoding portion serving as a no-modulating interval. That is, the whole area of such a portion becomes a land area.

In the postscript apparatus 200, the postscript related information 410 is obtained and stored in the modulation information storing unit 210. The postscript control unit 220 executes the EFM modulation to the postscript information 420, controls the postscript unit 230 for generating the laser beam of a high power so that the EFM signal is recorded in the interval corresponding to the subcoding portion, and forms pits into the subcoding portion. The pits shown as hatched portions in FIG. 3 indicate the pits formed by the postscript information. In the optical disc 350 as a product to which the information has been postscribed by the postscript apparatus 200, the modulation signal of the postscript information 420 has been recorded in the interval corresponding to the subcoding portion.

In the example of FIG. 3, a pattern of 14 channel bits after the postscript process becomes (01001000100100). The level of the EFM signal is inverted at the position of 1 of the channel bit. The 14 channel bits are obtained by EFM modulating the symbol of 8 bits of 40h. h denotes a hexadecimal notation and a pattern of 8 bits is (01000000). In the decimal notation, 8 bits is equal to a value "64". An example in which the information bits locating after the subcoding portion via the margin bits of 3 bits are 00h is shown.

The postscript information modulated by the same modulation system can be recorded onto the optical disc in which the modulation signal of the information data has been recorded as presence or absence of the pit of the coating film as mentioned above. By recording different data as postscript information every disc, it can be read out as identification information of the optical disc. From the optical disc as a postscribed product, the modulation signal of the postscript information can be reproduced together with the modulation signal of the information data by a reproducing apparatus corresponding to the conventional EFM modulation. As mentioned above, the individual identification information can be reproduced without the need to provide a special circuit for reading out the individual identification information for the reproducing apparatus.

In the above description, although the no-modulating intervals have been inserted into the EFM data of the information data, a servo-dedicated modulating interval in which modulation only for use of the servo is executed can be also used in place of the no-modulating interval. In this case, the postscript related information 410 is information to designate the modulating interval which is inserted into an arbitrary interval of the modulation signal data pattern and in which the servo-dedicated modulation has been performed. The modulation information forming unit 120 of the modulation signal transmitting apparatus 100 forms the modulation signal data in which a part of the modulation signal data pattern is set to the servo-dedicated modulating interval only for use of the servo in accordance with the postscript related information. The postscript control unit 220 of the postscript apparatus 200 makes control so as to postscript the modulation signal of the postscript information into the servo-dedicated modulating interval on the basis of the postscript related information. Intensity of the modulation signal in the servo-dedicated modulating interval is set so as to lie within an intensity range where the recorded optical disc which was postscribed by the postscript apparatus 200 can be read out.

The second postscript information recording method according to the invention will now be described. According to the second recording method, the EFM signal in which the information data has been modulated is formed in the modulation signal transmitting apparatus, the optical disc on which the EFM signal has been recorded is formed by the mastering step and the molding and film forming step, and the postscript information is recorded in an arbitrary interval by the postscript apparatus with reference to the EFM data formed by the modulation signal transmitting apparatus.

Figure 4:
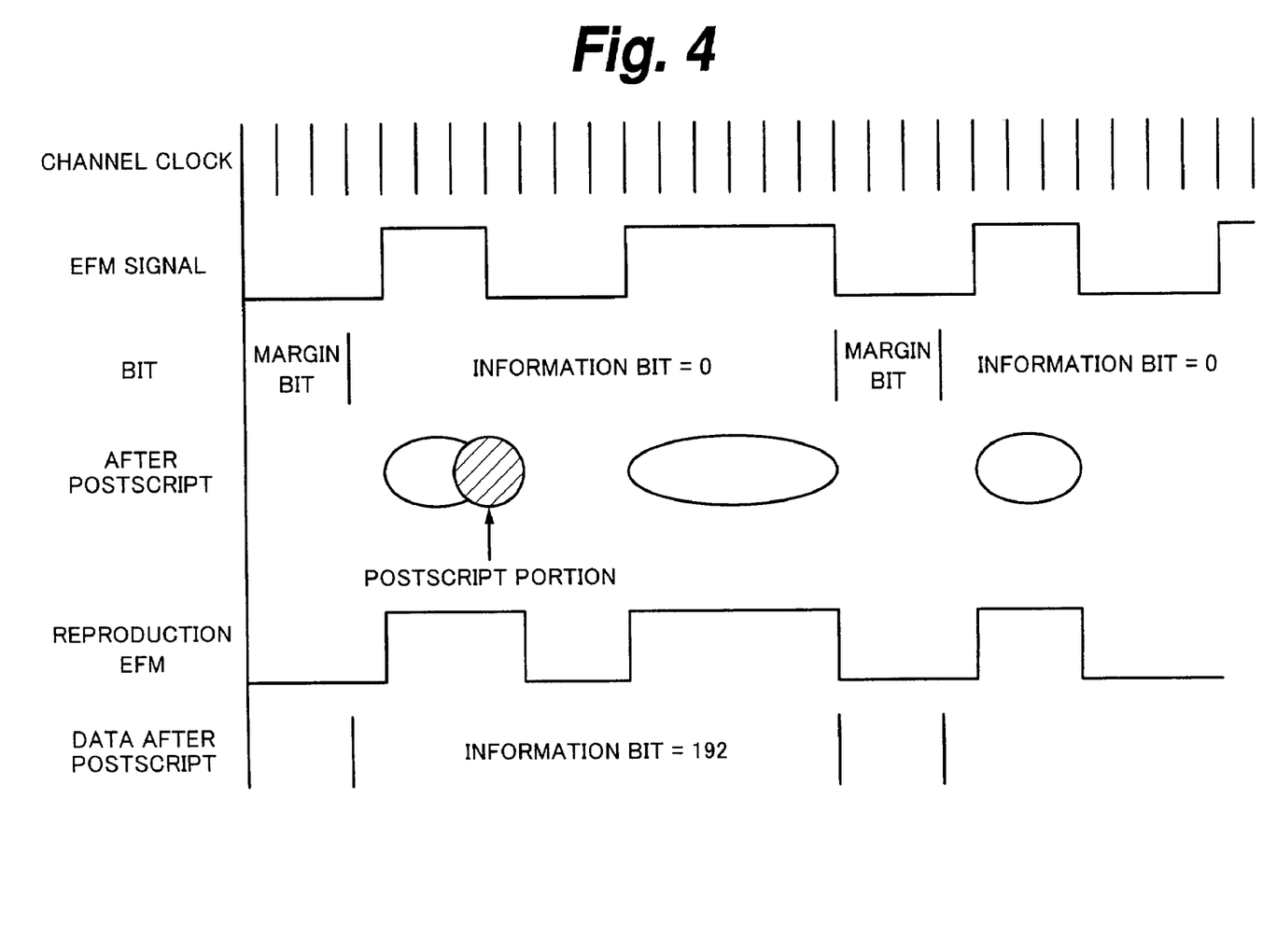
FIG. 4 is a schematic diagram for explaining a second postscript information recording method according to the invention.

FIG. 4 is a diagram for explaining the second postscript information recording method according to the invention.

In the modulation signal transmitting apparatus 100, the EFM modulation is executed to the information data and the EFM data is formed and sent to the postscript apparatus 200. In the postscript apparatus 200, the EFM data pattern is stored into the modulation information storing unit 210. The EFM signal formed by a process similar to the conventional one is outputted from the modulation signal transmitting apparatus 100 and the optical disc disc-master 320 is formed. The pit of the recorded optical disc 340 formed by the optical disc disc-master 320 corresponds to a portion shown as an ellipse in FIG. 4.

In the postscript control unit 220 of the postscript apparatus 200, the area for recording the modulation signal of the postscript information 420 is calculated with reference to the EFM data pattern held in the modulation information storing unit 210. Although an arbitrary method is used as a method of calculating the area, even in the case where the modulation signal of the postscript information 420 has been postscribed, an area where the run length restricting conditions of the EFM are not broken is selected.

In the example of FIG. 4, an interval of the margin bits (3 channel bits), information bits (14 channel bits), margin bits (3 channel bits), and information bits (14 channel bits) is shown. An interval where the pattern of the channel bits repeats (000010010001000000) is shown. That is, an interval where 4T=0, 3T=1, 4T=0, and 6T=1 (T indicates one channel clock and 4T=0 denotes that 0 continues in a 4T interval) are repeated is selected.

By performing the postscript process to an area after 3T=1, the portions of 3T=1 and 4T=0 are changed to 4T=1 and 3T=0. That is, by postscribing the pit shown as a hatched region to the pit of 3T shown as an ellipse, the pit of 4T is formed. Thus, the EFM signal of the information bit=0 is changed to the information bit=192 (14 channel bit pattern=01000100100000). The postscribed EFM signal can be normally read out on the reproducing apparatus side. In the apparatus on the reproducing side, both of the information data and the postscript information 420 can be obtained on the basis of information showing in which interval the postscript information 420 has been inserted.

According to the invention as mentioned above, the information can be postscribed to the optical disc recorded in the conventional format.

Although it is assumed in the description that a process is not particularly executed on the modulation signal transmitting apparatus 100 side, the postscript related information 410 such as conditions, interval, etc. for recording the postscript information 420 can be also preset into the modulation signal transmitting apparatus 100. Thus, at the time of the modulation regarding the postscript related information 410, that is, the information data of the interval where the postscript process is executed later, the modulation information forming unit 120 of the modulation signal transmitting apparatus 100 can select the EFM data pattern which takes into consideration of the execution of the postscript process. The postscript apparatus 200 side also executes the postscript process of the postscript information 420 on the basis of the postscript related information 410.

Figure 5:
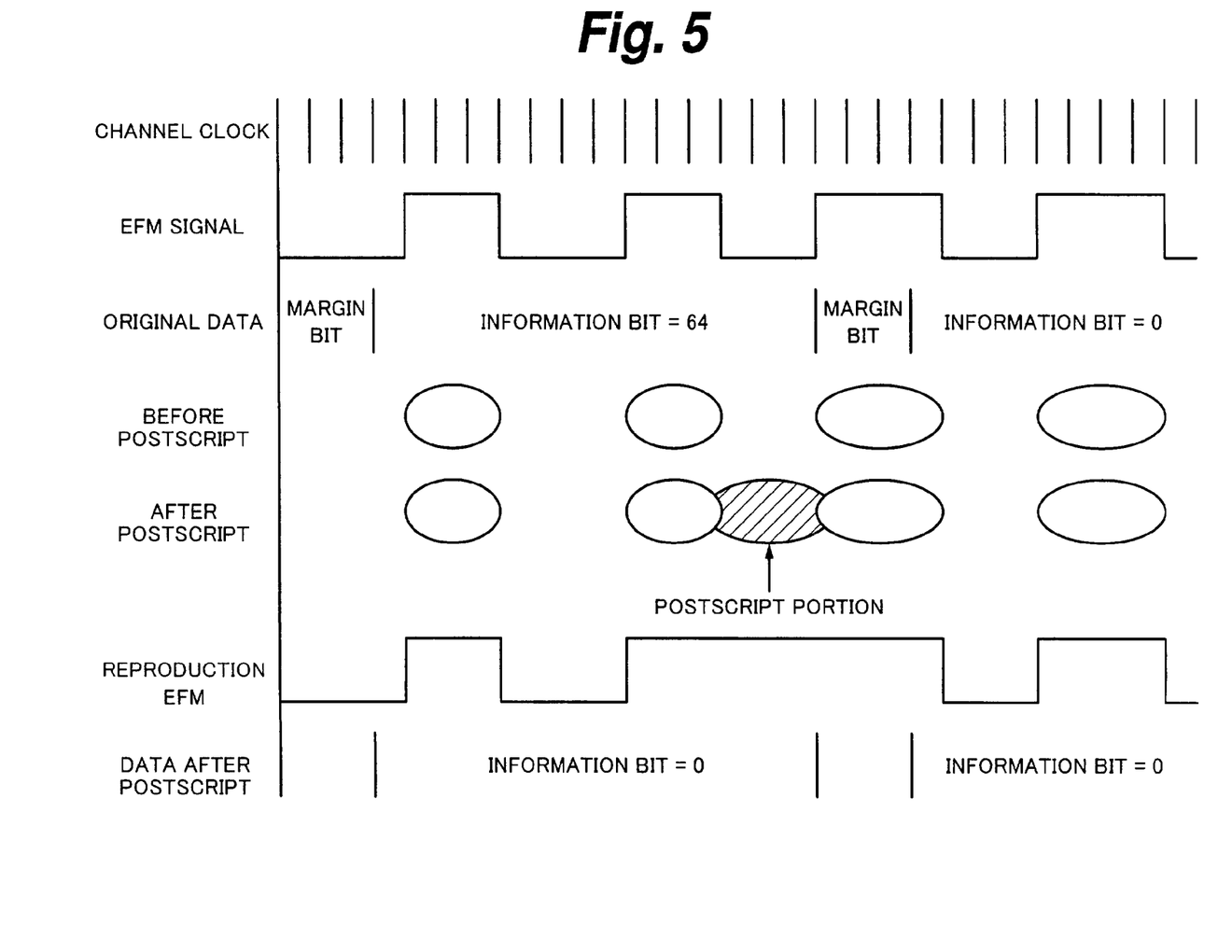
FIG. 5 is a schematic diagram for explaining the second postscript information recording method according to the invention.

Subsequently, an example of the original EFM data pattern in which the postscript information recording method of changing the data and recording the postscript information can be performed as mentioned above will be explained. FIG.

5 shows another example of data to which the second postscript information recording method according to the invention can be applied.

In the postscript apparatus 200, the postscript information 420 is recorded by forming pits to land portions by irradiating the laser beam of the high power. The postscript apparatus 200 irradiates the high power laser beam to a land area in the EFM data interval comprising the pit area and the land area which are formed on the optical disc 340 in accordance with such an EFM signal data pattern, thereby converting into one pit area. In the EFM, since the pit area or the land area has to be formed in a range from 3T to 1T, the original EFM data pattern in which the postscript information 420 can be recorded becomes a data pattern such that it has an array of the pit area of 3T, 4T, or 5T, the land area of 3T, 4T, or 5T, and the pit area of 3T, 4T, or 5T, and the sum of the pit area, the land area, and the pit area is equal to or less than 1T. In the postscript apparatus 200, the high power laser beam is irradiated to the land area of the EM data pattern of such an array and the EFM data pattern is changed so that the whole pattern becomes one pit. Specifically speaking, as an original EFM data pattern in which such a change is possible, there are the following ten patterns and each of them can be rewritten as follows.

(1) An EFM data pattern of a 3T pit area, a 3T land area, and a 3T pit area is set to a 9T pit.
(2) An EFM data pattern of a 4T pit area, a 3T land area, and a 3T pit area is set to a 10T pit.
(3) An EFM data pattern of a 5T pit area, a 3T land area, and a 3T pit area is set to a 11T pit.
(4) An EFM data pattern of a 3T pit area, a 4T land area, and a 3T pit area is set to a 10T pit.
(5) An EFM data pattern of a 4T pit area, a 4T land area, and a 3T pit area is set to a 11T pit.
(6) An EFM data pattern of a 3T pit area, a 5T land area, and a 3T pit area is set to a 11T pit.
(7) An EFM data pattern of a 3T pit area, a 3T land area, and a 4T pit area is set to a 10T pit.
(8) An EFM data pattern of a 4T pit area, a 3T land area, and a 4T pit area is set to a 11T pit.
(9) An EFM data pattern of a 3T pit area, a 4T land area, and a 4T pit area is set to a 11T pit.
(10) An EFM data pattern of a 3T pit area, a 3T land area, and a 5T pit area is set to a 11T pit.

In the example of FIG. 5, in the portion comprising the land area of the 3T pit area, 3T land area, and 4T pit area shown by ellipses, by executing the postscript process to the land area of 3T by the postscript apparatus 200, the pit of 10T is formed.

Figure 6:
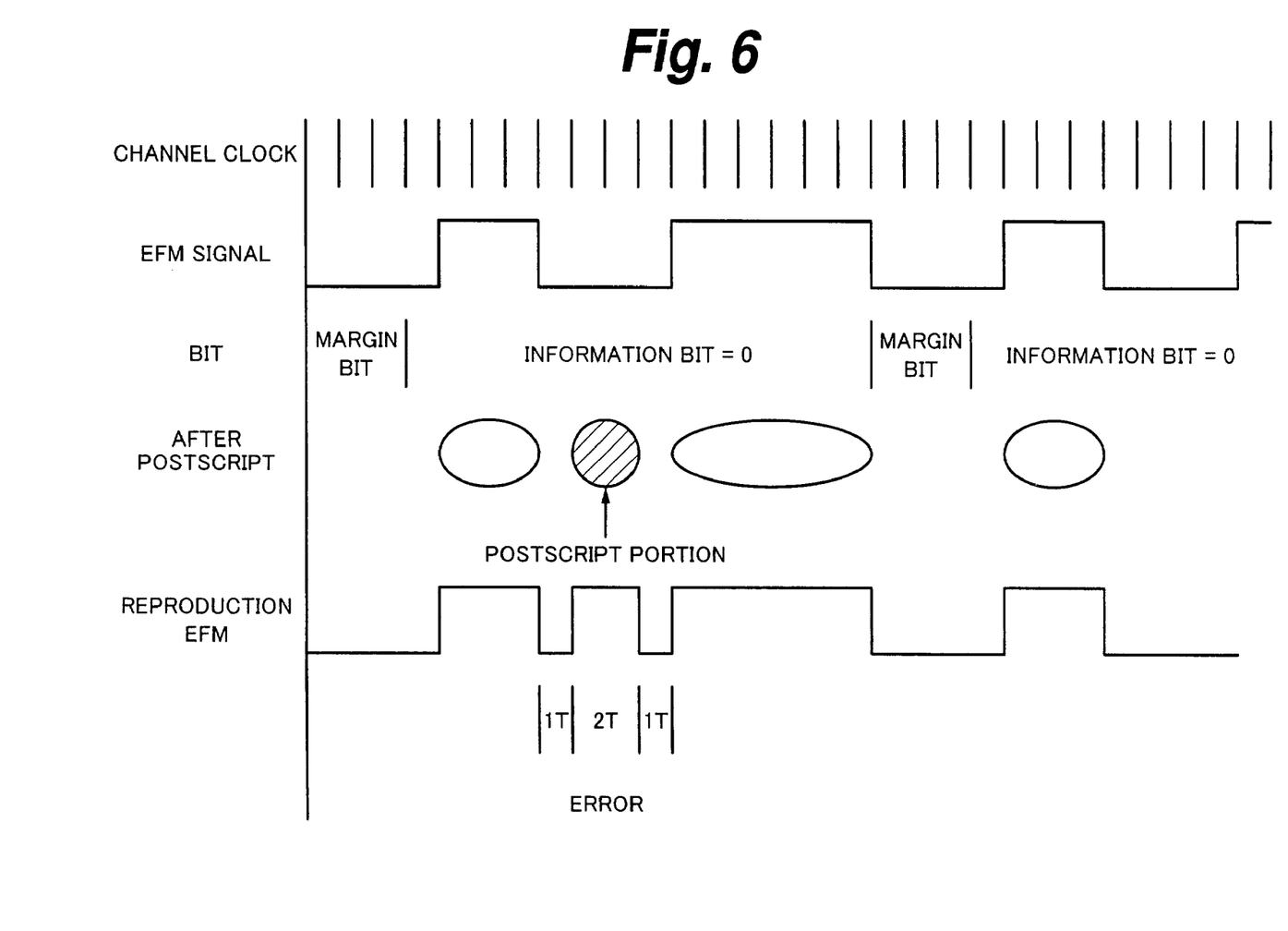
FIG. 6 is a schematic diagram for explaining a third postscript information recording method according to the invention.

The third postscript information recording method according to the invention will now be described. According to the third postscript information recording method, in a manner similar to the second postscript information recording method, the EFM signal in which the information data has been modulated is formed in the modulation signal transmitting apparatus 100 and the optical disc 340 is formed. In the postscript apparatus 200, the EFM data pattern formed by the modulation signal transmitting apparatus 100 is referred to and the information data is recorded so that an error is generated in the EFM signal in an arbitrary interval in accordance with the postscript information 420.

FIG. 6 is a diagram for explaining the third postscript information recording method according to the invention.

In the modulation signal transmitting apparatus 100, by executing the EFM modulation to the reproduced information data, the EFM data pattern is formed and sent to the postscript apparatus 200. In the postscript apparatus 200, the EFM data pattern is stored into the modulation information storing unit 210. The EFM signal formed by a process similar to the conventional one is generated from the modulation signal transmitting apparatus 100 and the optical disc disc-master 320 is formed. The pit on the optical disc 340 formed by the optical disc disc-master 320 corresponds to the portion shown by the ellipse in FIG. 6. In the postscript control unit 220 of the postscript apparatus 200, the EFM data held in the modulation information storing unit 210 is referred to and the information data is postscribed so that an error is generated in a predetermined interval. This interval can be set to an arbitrary interval, that is, a continuous interval or an interval which is selected in accordance with predetermined conditions.

In the example of FIG. 6, since the information bits are equal to "0", as a result of the EFM modulation, an information bit interval of 4T=0, 3T=1, 4T=0, and 6T=1 is formed. By performing the postscript process to the portion of 4T=0 in the information bit interval, they are changed to 1T=0, 2T=1, and 1T=0. That is, a pit corresponding to 2T=1 shown by a hatched region is postscribed to the land corresponding to 4T=0 between the pits corresponding to 3T=1 and 6T=1.

As mentioned above, since the EFM has been predetermined so as to satisfy the conditions of Tmin=3T and Tmax=11T, when the inverting intervals are changed to 1T, 2T, and 1T, an EFM error is generated. In the postscript control unit 220, whether errors are generated in a plurality of predetermined intervals in accordance with the postscript information 420 or not is discriminated, thereby controlling the postscript process. That is, on the reproducing apparatus side, whether the errors have been generated in certain predetermined intervals or not is detected, thereby obtaining the postscript information 420. For example, the case where the error is generated is assumed to be 1 and the case where no error is generated is assumed to be 0. The postscript information 420 is reproduced in dependence on the presence or absence of the error.

Although the embodiment has been described with respect to the case of generating the EFM error, an arbitrary kind of error can be generated. For example, the postscript process can be also executed so that an error due to an error correction code in a certain interval is generated. According to the invention as mentioned above, the postscript information can be also recorded onto the optical disc recorded in accordance with the conventional standard.

Figure 7:
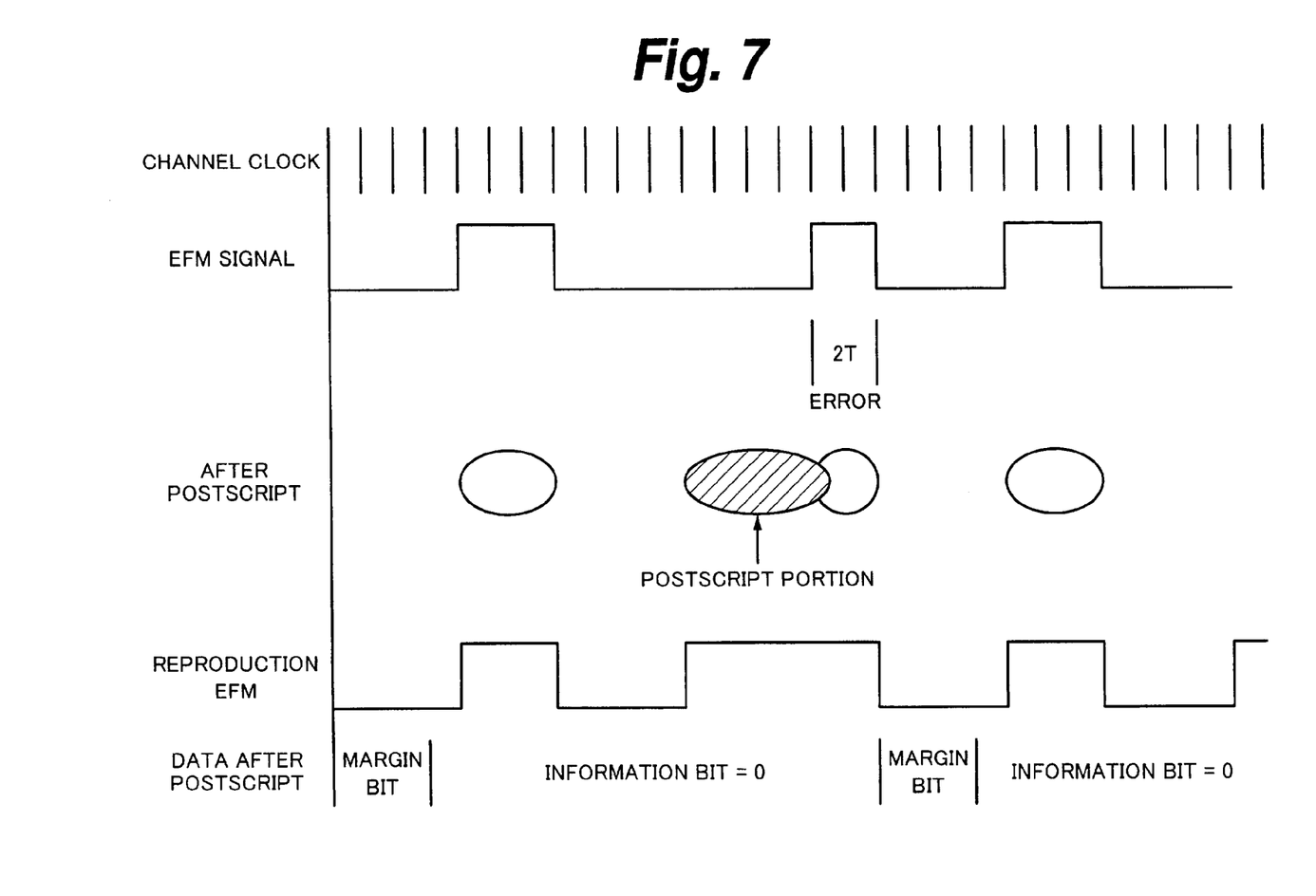
FIG. 7 is a schematic diagram for explaining a fourth postscript information recording method according to the invention.

The fourth postscript information recording method according to the invention will now be described. According to the fourth postscript information recording method, the EFM signal in which the EFM error is generated in an arbitrary interval of the EFM signal upon modulation of the information data is formed in the modulation signal transmitting apparatus 100 and the optical disc 340 on which the EFM signal has been recorded is formed. In the postscript apparatus 200, the EFM data formed by the modulation signal transmitting apparatus 100 is referred to and the information data is recorded so that the error in the arbitrary interval is correctly recovered in accordance with the postscript information 420, thereby forming the optical disc 350.

FIG. 7 is a diagram for explaining the fourth postscript information recording method according to the invention.

According to this recording method, on the modulation signal transmitting apparatus 100 side, the postscript related information 410 such as conditions, interval, etc. for recording the postscript information 420 is preset into the modulation signal transmitting apparatus 100. The modulation information forming unit 120 of the modulation signal transmitting apparatus 100 provides a blank interval (interval where no pit is formed) for a part of the EFM data upon modulation regarding the postscript related information 410, that is, the information data of the interval where the postscript process is executed, and forms the EFM data such that the EFM error is generated. In the example of FIG. 7, an interval of 2T=1 is set to a position after the blank interval of 8T=0 and the EFM signal such that the EFM error is generated is formed. The optical disc disc-master 320 is formed on the basis of the EFM signal. The optical disc 340 is formed by the optical disc disc-master 320. On the optical disc 340, a pit corresponding to 2T=1 is formed.

In the postscript apparatus 200, the postscript related information 410 is referred to and the postscript process is executed so as to correct the EFM error in accordance with the postscript information 420. In the example of FIG. 7, in the interval of 4T, a pit is postscribed as shown by a hatched region before the pit which forms 2T=1, thereby changing 2T=1 to 6T=1. Thus, the EFM error is corrected. In the postscript control unit 220, whether the EFM errors are corrected in a plurality of error intervals which have previously been formed in accordance with the postscript information 420 or not is discriminated, thereby controlling the postscript process. That is, in the reproducing apparatus for reproducing the postscribed optical disc 350, whether the EFM error has been generated in a certain predetermined interval or not is detected, thereby obtaining the postscript information 420. For example, by allowing the case where the EFM error is not corrected to correspond to 1 of the postscript information and allowing the case where the EFM error has been corrected to correspond to 0, the postscript information 420 is obtained in dependence on the presence or absence of the error.

The fifth postscript information recording method according to the invention will now be described.

Figure 9:
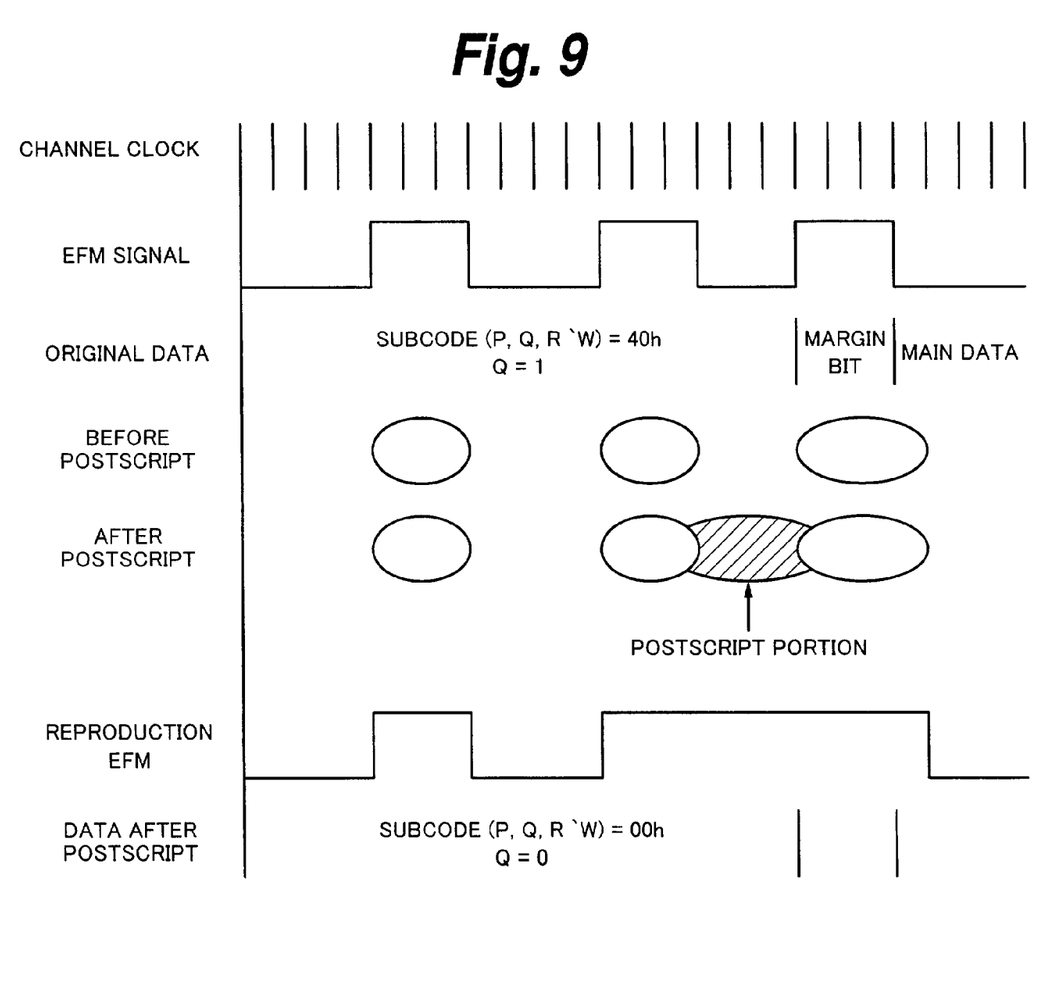
FIG. 9 is a schematic diagram for explaining a fifth postscript information recording method according to the invention.

According to the fifth postscript information recording method, in the modulation signal transmitting apparatus 100, the EFM signal such that predetermined data is generated in the EFM data corresponding to the information data in a predetermined interval is formed, and the optical disc 340 in which the predetermined data has been recorded is manufactured. In the postscript apparatus 200, the postscript process is executed so as to rewrite data in an arbitrary area where the predetermined data has been recorded in accordance with the postscript information 420, and the optical disc 350 is formed.

Figure 8:
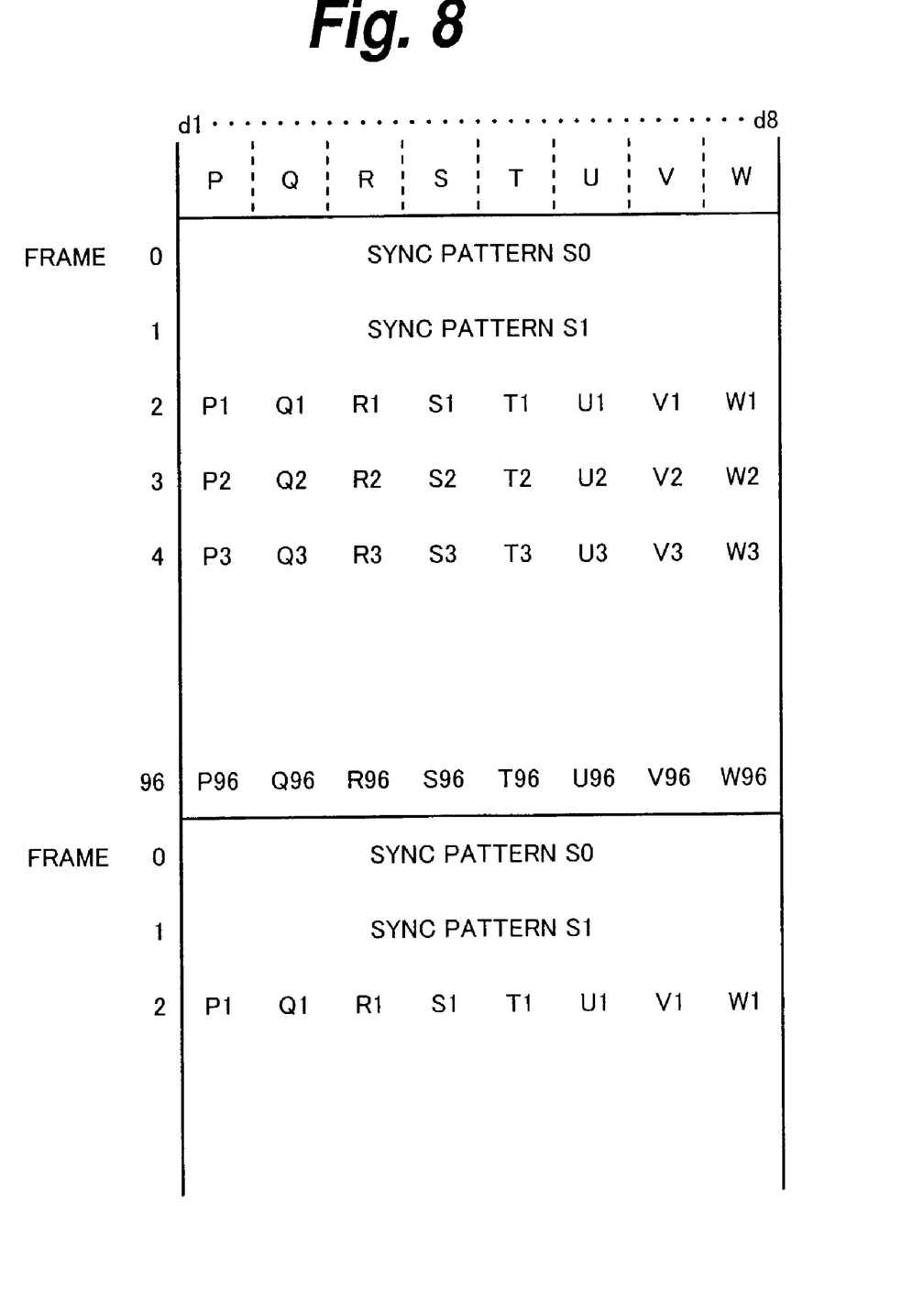
FIG. 8 is a schematic diagram showing a construction of subcoding data.

For example, in the signal format of the CD, as described in FIG. 2, the subcoding of one symbol is recorded in one frame. The subcodings of 98 frames are collected, thereby forming one subcoding block. FIG. 8 is a constructional diagram of the subcoding block. The data of 8 bits is set to P, Q, R, S, T, U, V, and W, respectively. For example, by presetting all data in the P to W channels excluding the Q channel data in the subcoding block to 0 and by presetting only the Q channel data to 1 or 0 in accordance with the postscript information, the postscript information can be recorded onto the optical disc. That is, either a state where 8 bits of P to W are set to (00000000) or a state where they are set to (01000000) can be selected by the postscript process.

FIG. 9 is a diagram for explaining the fifth postscript information recording method according to the invention.

After the modulation by the modulation signal transmitting apparatus 100, information data is preset so that the subcoding portion is set to 40h ((01000000) in the pattern of 8 bits). 14 channel bits of the EFM signal corresponding to 40h are set to (01001000100100). In correspondence to those 14 channel bits, pits are formed on the optical disc 340. In the Q channel data at this stage, all 96 bits of the subcoding block are equal to 1.

In the postscript apparatus 200, the postscript process is executed so that arbitrary bits among the 96 bits of the Q channel data are set to 0 in accordance with the postscript information 420. Specifically speaking, the laser beam is irradiated to the land between the pit of 3T and the pit of the margin bits, thereby forming the pit of 6T. The EFM data after completion of the postscript process becomes (01001000100000). It corresponds to 00h in the case of the data of 8 bits. That is, the Q channel data is changed from 0 to 1 by the postscript process. In this manner, 96 bits of the Q channel data can be set to arbitrary data and the postscript information 420 can be recorded. Particularly, since the subcoding data of the channels other than the Q channel is not changed, only the Q channel data can be changed. Besides the example of changing 40h to 00h, 47h can be also changed to 07h.

The invention is not limited to the embodiments or the like of the invention mentioned above but various modifications and applications are possible within the scope without departing from the spirit of the invention. For example, although the molding and film forming apparatus and the postscript apparatus have been constructed as different apparatuses in the foregoing description, the postscript apparatus can be also assembled into the molding and film forming apparatus. Further, it is also possible to provide a plurality of postscript apparatuses and execute the postscript processes in parallel. Although the pits are formed by the high power laser as recording of the postscript information in the above description, it is also possible to construct in a manner such that a change in reflectance is caused on the surface of the optical disc by the high power laser and, when the optical disc is reproduced by the reproducing apparatus, a reproduction signal which is equal to the pit is obtained.

As described above, in the optical disc forming system of the invention, the postscript information modulated in a manner similar to the format of the information data can be recorded to the recorded optical disc formed in the molding and film forming apparatus. As mentioned above, according to the invention, the postscript information can be recorded to the recorded optical disc formed in the optical disc producing step similar to that of the existing system. Since arbitrary information can be used as postscript information, for example, identification information can be recorded to the optical disc. Thus, use applications of the optical disc is widened. According to the invention, there is an advantage such that there is no need to change the existing optical disc producing step. Further, there is an advantage such that the postscribed information can be read out without remodeling the reproducing apparatus or using a special circuit and the compatibility is not lost.

The invention claimed is:

1. An optical disc medium having a substrate on which a shape according to information data modulated by a modulating method in which a minimum inverting interval and a maximum inverting interval have been specified has been formed and a coating film formed on the substrate, wherein
predetermined postscript information has been recorded into predetermined recorded information data by recording said predetermined postscript information to said coating film so as to comply with the rule of said minimum inverting interval and said maximum inverting interval.

2. An optical disc medium according to claim 1, wherein said information data is main information.

3. An optical disc medium according to claim 1, wherein said information data is secondary information for control.

4. An optical disc medium according to claim 1, wherein said postscript information is disc identification information.

5. A data recording method of forming an optical disc medium having a substrate on which a shape according to information data modulated by a modulating method in which a minimum inverting interval and a maximum inverting interval have been specified has been formed and a coating film formed on the substrate, wherein predetermined postscript information is recorded into predetermined recorded information data by recording said predetermined postscript information to said coating film so as to comply with the rule of said minimum inverting interval and said maximum inverting interval.

6. A data recording apparatus for forming an optical disc medium having a substrate on which a shape according to information data modulated by a modulating method in which a minimum inverting interval and a maximum inverting interval have been specified has been formed and a coating film formed on the substrate, wherein predetermined postscript information is recorded into predetermined recorded information data by recording said predetermined postscript information to said coating film so as to comply with the rule of said minimum inverting interval and said maximum inverting interval.

* * * * *